(12) United States Patent
Röhm

(10) Patent No.: US 6,186,515 B1
(45) Date of Patent: Feb. 13, 2001

(54) AIR-COOLED HYDRAULIC CHUCK ACTUATOR

(75) Inventor: Günter Horst Röhm, Sontheim (DE)

(73) Assignee: Rohm GmbH, Sontheim (DE)

( * ) Notice: Under 35 U.S.C. 154(b), the term of this patent shall be extended for 0 days.

(21) Appl. No.: 09/320,905

(22) Filed: May 27, 1999

(30) Foreign Application Priority Data

May 28, 1998 (DE) .............................. 198 23 823

(51) Int. Cl.$^7$ ................................ B23B 31/30
(52) U.S. Cl. ..................... 279/4.01; 92/106; 92/144; 165/47
(58) Field of Search ................ 279/4.01; 92/106, 92/144; 165/47

(56) References Cited

U.S. PATENT DOCUMENTS

| | | | |
|---|---|---|---|
| 3,285,328 | * 11/1966 | Woodward | 165/47 |
| 4,319,516 | * 3/1982 | Rohm | 92/106 |
| 4,523,632 | * 6/1985 | Nobukawa et al. | 165/47 |

FOREIGN PATENT DOCUMENTS

| | | | |
|---|---|---|---|
| 30 16 088 | 11/1980 | (DE) . | |
| 2034624 | 6/1980 | (GB) . | |
| 2440801 | 6/1980 | (FR) . | |
| 2135606 | * 9/1984 | (GB) | 279/4.01 |
| 58-102608 | * 6/1983 | (JP) | 279/4.01 |
| 6-190615 | * 7/1994 | (JP) | 279/4.01 |

* cited by examiner

Primary Examiner—Steven C. Bishop
(74) Attorney, Agent, or Firm—Herbert Dubno; Andrew Wilford

(57) ABSTRACT

A chuck actuator has a cylinder housing rotatable about a main axis and forming a chamber, a piston axially subdividing the chamber into a pair of compartments and axially displaceable in the chamber, and a stem centered on the axis, extending from the housing, and formed with a pair of passages each having one end opening into a respective one of the compartments and an opposite end opening on the stem offset from the piston. A distributor body is rotatable about the axis on the stem and has connections for feeding fluid under pressure into the opposite ends of the passages for axially displacing the piston in the chamber. The cylinder housing is formed with cooling openings directed at the distributor body.

9 Claims, 3 Drawing Sheets

AIR-COOLED HYDRAULIC CHUCK ACTUATOR

FIELD OF THE INVENTION

The present invention relates to a chuck actuator. More particularly this invention concerns an air-cooled actuator for a lathe chuck.

BACKGROUND OF THE INVENTION

A standard chuck assembly has an actuator cylinder centered on and rotatable about an axis but substantially nondis-placeable relative to the axis and a chuck housing spaced axially from the cylinder. A tubular connecting shaft extending along the axis is connected fixedly between the cylinder and the chuck housing so that the cylinder, connecting shaft, and chuck housing rotate jointly about the axis but do not move along the axis. A chuck piston axially displaceable in the chuck housing has an inner end turned axially toward the actuator cylinder and an actuator piston is axially displaceable in the cylinder. The chuck piston and actuator piston are axially interconnected by a shaft assembly comprising an actuator shaft fixed to the actuator piston and having an outer end and a chuck shaft having an inner end connected to the actuator-shaft outer end and an outer end connected to the chuck-piston inner end. The chuck has radially displaceable jaws operated by its piston so that a workpiece can be gripped between these jaws and rotated about the axis for machining.

The actuator piston defines in the actuator housing a pair of compartments and the actuator housing has a rearwardly extending connection sleeve formed with a pair of passages each having one end opening into a respective one of the compartments and an opposite end opening radially outwardly at locations offset axially from each other and from the piston and actuator housing. A distributor body is mounted on this connection sleeve and has fittings connected to two fluid supply lines that can be alternately pressurized and depressurized. This body is rotatable about the main axis on the connection sleeve and can even move axially limitedly with this connection sleeve.

Fluid can be fed under pressure alternately to the fittings to pressurize and depressurize the respective compartments and thereby axially displace the piston in the cylinder since the cylinder is connected to the chuck body and the piston to the chuck-actuating piston or member for actuation of the actual chuck jaws. Double check valves built right into the piston inhibit flow out of either of the compartments unless one of the passages is pressurized.

The region where the connector body rides on the rapidly rotating connection sleeve of the actuator housing can get fairly hot, especially as seals are provided flanking the locations where radially inwardly or outwardly open grooves on one of the parts confront radially outwardly or inwardly open ports on the other part for fluid transfer between the parts. In order to cool this region it has been suggested simply to provided fan-like vanes on the cylinder housing, which rotates at high speed with the chuck body, to force air over this region.

The problem with this system is that the air-circulating structure generate considerable hum. The machine-shop environment is noisy enough under the best of circumstances, so this additional source of sound is considered highly undesirable.

OBJECTS OF THE INVENTION

It is therefore an object of the present invention to provide an improved air-cooled chuck actuator.

Another object is the provision of such an improved air-cooled chuck actuator which overcomes the above-given disadvantages, that is which runs quietly.

SUMMARY OF THE INVENTION

The chuck actuator according to the invention has a cylinder housing rotatable about a main axis and forming a chamber, a piston axially subdividing the chamber into a pair of compartments and axially displaceable in the chamber, and a stem centered on the axis, extending from the housing, and formed with a pair of passages each having one end opening into a respective one of the compartments and an opposite end opening on the stem offset from the piston. A distributor body is rotatable about the axis on the stem and has in turn connections for feeding fluid under pressure into the opposite ends of the passages for axially displacing the piston in the chamber. In accordance with the invention the cylinder housing is formed with cooling openings directed at the distributor body.

The air forced through the cooling openings is less turbulent than with the fan vanes of the prior art, so the system is fairly quiet. At the same time there is sufficient air flow to provided the necessary cooling and thereby avoid overheating of the critical distributor joint.

Preferably in accordance with the invention the cylinder housing has an annular ridge formed with the cooling openings. Thus these openings can be oriented as wanted, need not inherently be set at an outside-to-inside angle.

The openings according to the invention are of axially decreasing cross section toward the distributor body, preferably frustoconical. This formation accelerates the air passing through them so that it will be projected further over the distributor.

According to a further feature of the invention each of the openings is centered on a respective opening axis inclined at an acute angle to a respective plane including the main axis. Thus air flow is not simply tangential past the openings, but is actually into them. This reduces turbulence and, once again, noise generated while increasing heat exchange and cooling capacity.

Since a chuck can be rotated in two directions, according to the invention the openings are arranged in pairs and one opening of each pair is inclined positively with respect to the respective plane and the other opening of each pair is inclined negatively with respect to the respective plane. Thus no matter which direction the actuator is rotating, half of the openings will be catching air. The openings are generally angularly equidistant about the axis.

To maximize internal heat exchange with the air flow going over the entire distributor body, the distributor body is formed with a helicoidal cooling rib. Such ribs increase the heat exchange by increasing the surface actually contacted by the cooling air flow. In addition in accordance with the invention each cooling rib extends at an angle corresponding to that of the openings. This ensures even smoother, less turbulent flow for quieter and more efficient operation. Furthermore the actuator is provided with an air-conducting sleeve surrounding the body.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
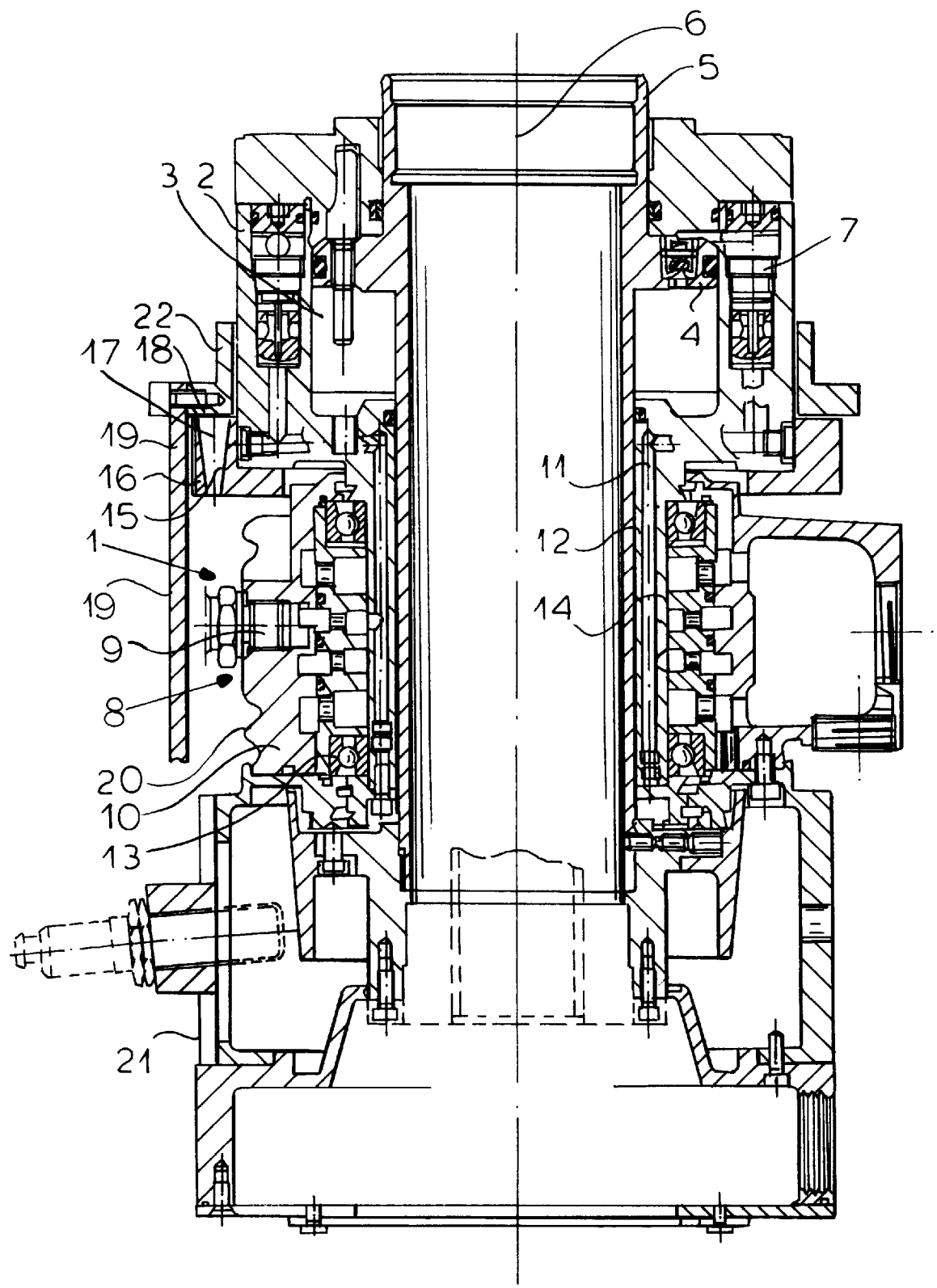
FIG. 1 is an axial section through a chuck actuator according to the invention.

As seen in FIG. 1 a chuck actuator 1 has a cylinder housing 2 centered on a main axis 6 and normally fixed to the rear end of an unillustrated tube shaft that itself is seated in a bearing so it and the housing 2 can rotate about the axis 6 without moving axially relative to it, and the opposite front end of the tube shaft is fixed to an unillustrated chuck body as described in my commonly owned application 09/193, 709. A chamber 3 defined in this housing 2 is subdivided into front and rear compartments by a piston 4 that itself is normally connected via a coaxial inner tube shaft 5 to a jaw-actuating part of the unillustrated chuck. This construction is fairly standard.

The cylinder housing 2 is formed with a rearwardly extending coaxial sleeve 12 forming part of a distributor 8 also comprising a body 10 that is mounted on this sleeve 12 by bearings 13 so it can rotate about the axis 6 relative to the sleeve 12 but not move along the axis 6 relative to it. The rear end of the center tube shaft 5 of the piston 4 fits into a drain housing 21 fixed to the distributor body 8 and, therefore, generally stationary. Connectors 9 on the body 8 communicate with passages 11 that lead to the front and rear compartments of the chamber 3 as is also well known in the art. A seal region 14 where the distributor body 10 rotates relative to the cylinder sleeve 12 is the site of some friction so that, when the two parts rotate relative to each other at high speed, they can generate considerable heat at this location.

Figure 2:
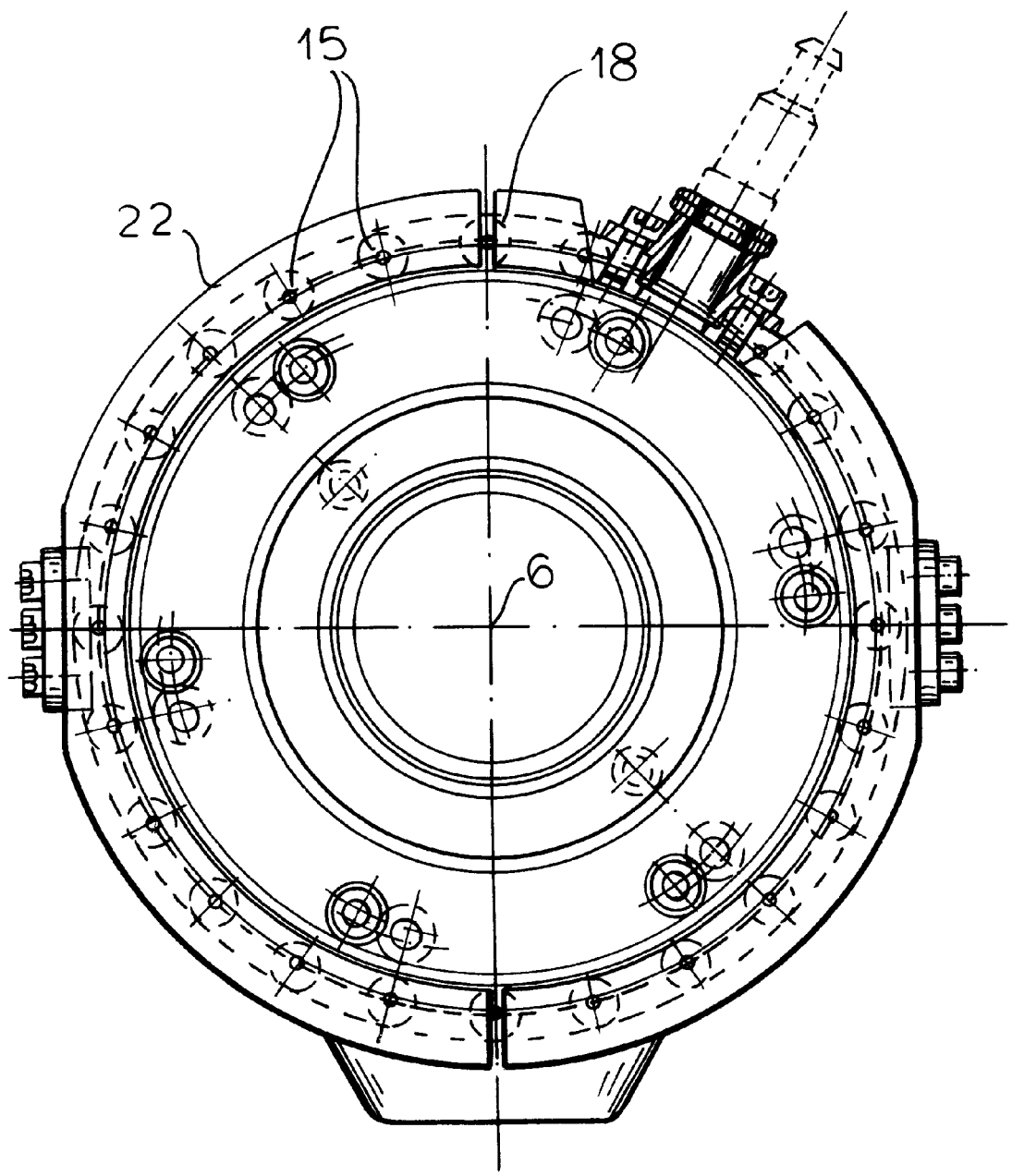
FIG. 2 is an end view of the actuator in accordance with the invention.
Figure 3:
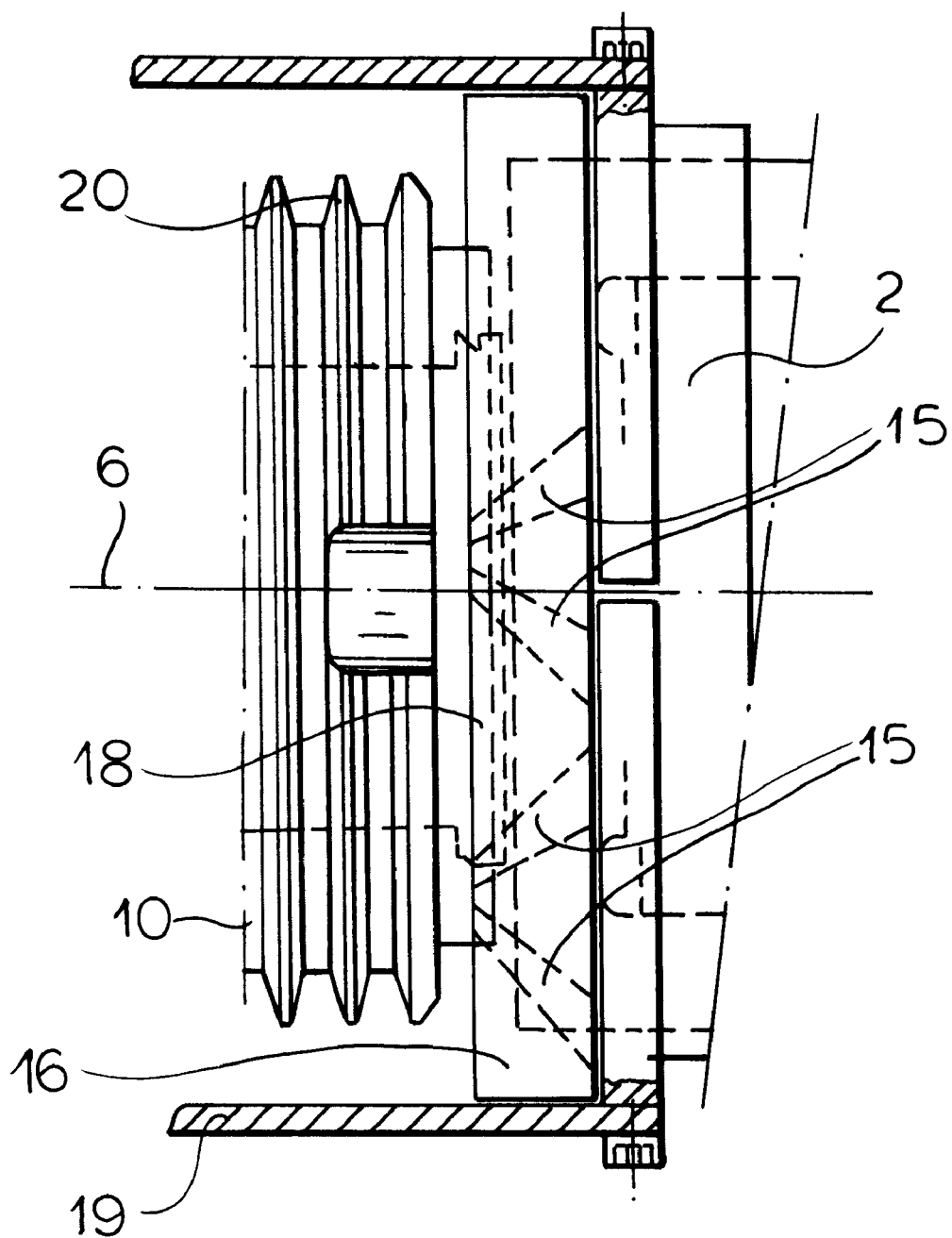
FIG. 3 is a side view partly in axial section through the actuator according to the invention.

As also shown in FIGS. 2, and 3, the housing 2 according to the invention is formed with a radially outwardly projecting annular rim 16 formed with a plurality of pairs of angularly equispaced holes 15 of frustoconical shape having large-diameter mouths 18 turned away from the distributor body 8. These cooling holes 15 are centered as shown in FIG. 3, on respective axes inclined to respective planes including the axis 6, with one hole 15 of each pair of holes 15 being inclined positively to this imaginary plane and the other hole 15 of each pair being inclined negatively so they catch air regardless of the direction in which the actuator housing 2 is rotated. The air is thus compressed as it goes through the openings 15 and forced as cooling jets over the outer surface of the body 8 which is formed with a helical rib 20 inclined at an angle equal to that of the holes 15 to minimize turbulence.

In addition according to the invention the device is provided with an air-conducting shield 19 which confines the air flows from the openings 15 and forces this air into good cooling contact with the body 8. The shield 19 has one end fixed to the generally stationary drain casing 21 and an opposite end carrying an L-section ring 22 which is formed with axially throughgoing holes that allow air into the outer ends of the holes 15.

I claim:
1. In a chuck actuator having:
a cylinder housing rotatable about a main axis and forming a chamber;
a piston axially subdividing the chamber into a pair of compartments and axially displaceable in the chamber;
a stem centered on the axis, extending from the housing, and formed with a pair of passages each having one end opening into a respective one of the compartments and an opposite end opening on the stem offset from the piston;
a distributor body rotatable about the axis on the stem and provided with means for feeding fluid under pressure into the opposite ends of the passages for axially displacing the piston in the chambers, the cylinder housing being formed with cooling openings directed at the distributor body and of axially decreasing cross section toward the distributor body.
2. The improved actuator defined in claim 1 wherein the cylinder housing has an annular ridge formed with the cooling openings.
3. The improved actuator defined in claim 1 wherein the actuator includes an air-conducting sleeve surrounding the body.
4. In a chuck actuator having:
a cylinder housing rotatable about a main axis and forming a chamber;
a piston axially subdividing the chamber into a pair of compartments and axially displaceable in the chamber;
a stem centered on the axis, extending from the housing, and formed with a pair of passages each having one end opening into a respective one of the compartments and an opposite end opening on the stem offset from the piston;
a distributor body rotatable about the axis on the stem and provided with means for feeding fluid under pressure into the opposite ends of the passages for axially displacing the piston in the chamber, the cylinder housing being formed with cooling openings directed at the distributor body, each of the openings being centered on a respective opening axis inclined at an acute angle to a respective plane including the main axis.
5. The improved actuator defined in claim 4 wherein the openings are of axially decreasing cross section toward the distributor body.
6. The improved actuator defined in claim 4 wherein the openings are arranged in pairs and one opening of each pair is inclined positively with respect to the respective plane and the other opening of each pair is inclined negatively with respect to the respective plane.
7. The improved actuator defined in claim 4 wherein the openings are generally angularly equidistant about the axis.
8. The improved actuator defined in claim 4 wherein the distributor body is formed with a helicoidal cooling rib.
9. The improved actuator defined in claim 8 wherein the cooling rib extends at an angle corresponding to that of the openings.

* * * * *